United States Patent [19]

Pfalzgraf

[11] Patent Number: 4,886,402

[45] Date of Patent: Dec. 12, 1989

[54] DEVICE FOR MOUNTING OF TOOLHOLDERS

[75] Inventor: Emile Pfalzgraf, Bouxwiller, France

[73] Assignee: Emile Pfalzgraf "EPB", S.A., Bouxwiller, France

[21] Appl. No.: 223,967

[22] Filed: Jul. 25, 1988

[30] Foreign Application Priority Data

May 6, 1988 [EP] European Pat. Off. ........ 88440036.7

[51] Int. Cl.[4] .......................... B23C 5/26; B21B 31/04
[52] U.S. Cl. .................................. 409/234; 279/1 A; 408/239 A
[58] Field of Search .................... 279/1 A, 1 TS, 8; 409/234, 232, 233; 408/239 A, 239 R; 82/36 A, 36 B

[56] References Cited

U.S. PATENT DOCUMENTS

| | | | |
|---|---|---|---|
| 3,680,435 | 8/1972 | De Plante | 409/232 |
| 3,895,881 | 7/1975 | Langlois | 409/232 X |
| 4,238,167 | 12/1980 | Brugger et al. | 409/232 |
| 4,412,767 | 11/1983 | Schmid et al. | 409/234 |
| 4,548,532 | 10/1985 | Watanabe | 409/233 |
| 4,617,846 | 10/1986 | Horsch | 409/233 X |
| 4,642,005 | 10/1987 | Kondo | 409/232 |
| 4,784,536 | 11/1988 | Pfalzgraf | 408/239 A X |

FOREIGN PATENT DOCUMENTS

| | | | |
|---|---|---|---|
| 202091 | 11/1986 | European Pat. Off. | 279/1 A |
| 2831660 | 3/1979 | Fed. Rep. of Germany | 279/1 A |
| 3506901 | 8/1986 | Fed. Rep. of Germany | 279/1 A |
| 16329 | 1/1985 | Japan | 409/233 |
| 656751 | 4/1979 | U.S.S.R. | 409/233 |
| 984722 | 1/1983 | U.S.S.R. | 409/232 |

Primary Examiner—William Briggs
Attorney, Agent, or Firm—Young & Thompson

[57] ABSTRACT

Device for mounting of attachments, toolholders and tools with cone and face application, especially for machining and turning centers with automatic or manual changers of tools with tapered shank, in particular with 7/24th taper, comprising a cone (1) for introduction in the spindle, a front part (2) centered in an aperture in the cone (1) and provided with a flange for application against the face of the spindle and a gripping knob (3) for assembly of cone (1) and front part (2). The gripping knob is connected to an intermediate nondeformable connecting device having structure to allow adjustment of the length thereof. The connecting device is connected to the front part thereby to secure the front part to the cone.

8 Claims, 4 Drawing Sheets

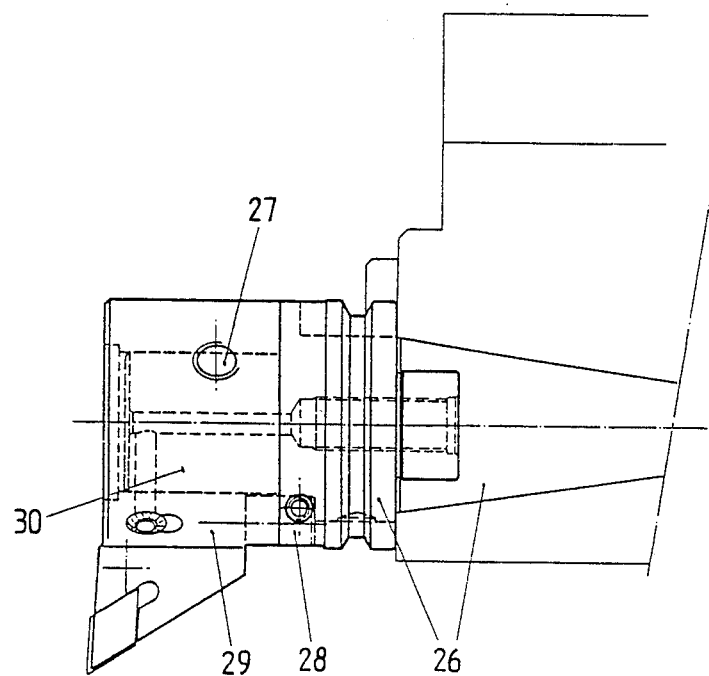
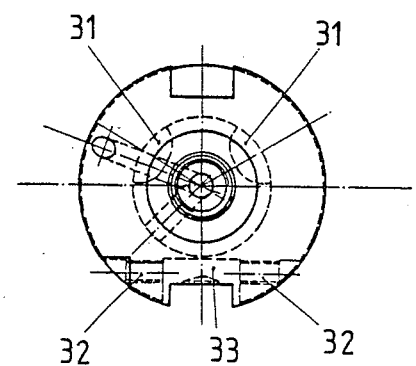
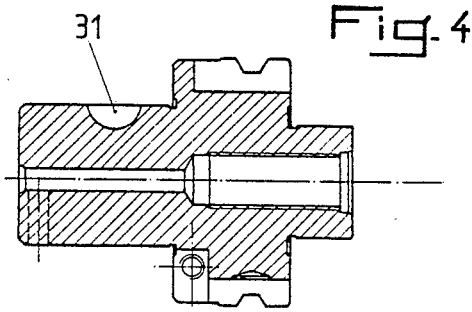
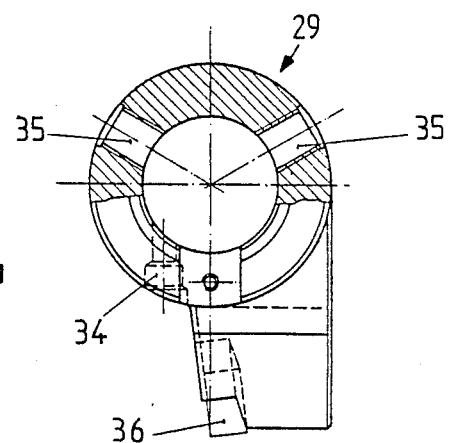

37  38  26

51 43 45 44  47
48
50
3 42 40  41 46

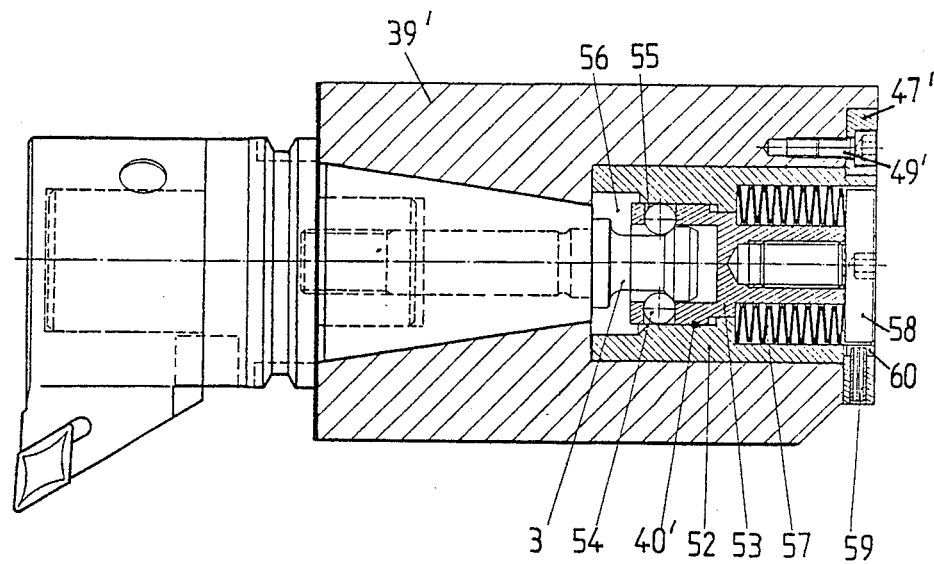

DEVICE FOR MOUNTING OF TOOLHOLDERS

This invention relates to the field of accessories of machine tools, with numeric control, machining and turning centers, flexible cells and manufacturing systems, with automatic and manual tool changers, and has as its object a device for mounting of attachments of toolholders or of tools with tapered shanks, in particular with 7/24th taper, with cone and face application, particularly for machining and turning centers with automatic or manual tool changers At present fastening or mounting of a tool attachment or of toolings in the spindles of milling, boring, numeric control machines, of machining centers or flexible cells or manufacturing systems, is generally achieved by means of tapered shanks whose most current taper is 7/24ths, according to the norms of American standards. These mountings and fastenings were satisfactory up to now and still are for some operations.

The accession of machining centers with 7/24th taper, most of the time exhibiting a tapered back and a special flange for automatic changing of the tools, has led to a modification of the standard 7/24th taper with simple flange and back thread for fastening by threaded bolt Most spindles of machines now made are provided for mounting of tools exhibiting 7/24th tapers and flanges corresponding to the usual standards, there still being some machines with flanges quite specific to certain manufacturers.

The known type of fastening, described above, is still satisfactory for some applications, but because of the increase in power and considerable performance of machines and tooling centers, as well as very considerable developments made in inserts and cutting tools, fastening of the cones in the spindles is no longer suited to the progress made by the machines and the performances of tools and therefore constitutes a considerable handicap, the power developed by the machines and the resulting forces able to be absorbed by the tools not being transmissible to the level of the cone.

Actually, the critical point and the weakness of present fastenings are most often at the spindle output, which is the point weakening all toolholders or tools, these having to meet a specific diameter of the tool, which is the large diameter of the end of the cone connected by a cylindrical portion of slight length to the flange. The same problem also arises, but in a less crucial way, for fastening tools with a 7/24th taper to lathes.

Moreover, it has been proposed to perform the fastening of the tools by means of a cylindrical shank with application against the front face of the spindle. This embodiment certainly makes it possible to solve the problem of perfect contact between the surfaces but requires a modification of the spindles of the machines. Further, the weight of the tool, considerable in some cases, runs the risk of modifying its alignment relative to the axis of the spindle and the positioning of the tool changer must be performed in extremely close tolerances in all directions, to permit a perfect alignment of the axis of the spindle and the toolholders.

It has also be proposed, in case high performances must be achieved, to obtain a simultaneous application of the cone and of the face of the spindle, to make single-piece standard cones by means of dimensions specific to each spindle. However, such an embodiment involves extremely high prices and requires production tolerances that cannot be maintained for series production. Further, the tools thus obtained are absolutely specific to a given spindle and in no case are interchangeable with the tools intended for other spindles, therefore for other machines This embodiment therefore is good only to meet specific problems.

French application FR 87 16604 and corresponding European application EP 87440086.4 further describe a mounting device with tapered shank, in particular with 7/24th taper, with cone and face application for attachments, toolholders and tools which essentially consists of a cone for introduction in the spindle, by a front part centered in the cone and provided with a flange for application against the face of the spindle, by a knob for assembly of the cone and of the front part, by an elastic pressure unit of the cone in the spindle in locking position, mounted with compression between the cone and the front part, and by a means for adjustment of said pressure unit.

The device according to the latter applications, without modification of the spindles of existing machines, makes it possible to achieve a simultaneous application in the cone of the spindle and on the front face during introduction and locking of the attachments, so that the rigidity of the assembly mounted in the spindle is improved and the vibrations generated during machining are reduced.

However, there are machining centers on the market whose system for locking the toolholders consists of an element for locking the toolholders, a bolt loaded with a stack of washers developing a slight power and, moreover, not having additional mechanical blocking or locking. Thus, in the case of use of certain cutters, particularly toothed cutters, whose spiral, intended to evacuate the chips better during machining, exhibits an axial slope opposite that of locking the attachment, such a great axial and radial pressure appears that the locking pressure of the bolt no longer permits a rigid application of the toolholders and of the tool in the spindle, this pressure even being able to reach such a force that the back face of the flange of the front part comes loose from the front face of the spindle, the cone and front part not forming a sufficiently rigid unit.

This invention aims at reducing these drawbacks.

Actually, it has as its object a device for mounting of attachments, of toolholders and of tools with cone and face application, especially for machining and turning centers with automatic or manual changers of tools with tapered shank, in particular with 7/24th taper, which essentially consists of a cone for introduction in the spindle, of a front part centered in the cone and provided with a flange for application against the face of the spindle and of a knob for assembly of the cone and of the front part, characterized in that the assembly knob acts on an intermediate adjustable, nondeformable connecting device between the cone and front part.

The invention will be better understood, thanks to the description below, which refers to preferred embodiments, given by way of nonlimiting examples, and explained with reference to the accompanying diagrammatic drawings in which:

FIGS. 2 and 3 are views in lateral elevation representing mounting of the toolholders (insert-holders) by means of the device according to the invention;

FIG. 4 is a view in longitudinal section of the attachment of the toolholders of the insert-holders according to FIG. 3;

FIG. 5 is an elevation view from the back of the attachment according to FIG. 4;

FIG. 6 is an elevation view from the back, partially in section, of an insert-holder;

FIG. 9 is a view similar to that of FIG. 8 of another variant embodiment of the invention adapted to fastening of turning cassettes.

Figure 1:
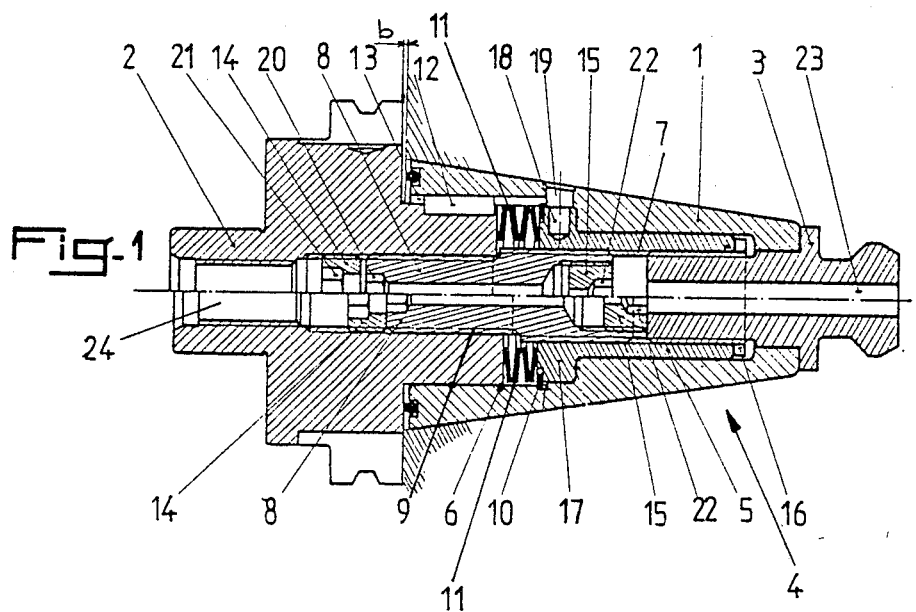
FIG. 1 is a lateral elevation and a view in section of the device according to the invention, along two half-sections, representing, that of the top, an attachment before final adjustment and that of the bottom, the attachment fastened in the spindle after adjustment.

According to the invention and as shown more particularly, by way of example, in FIG. 1 of the accompanying drawings, the device for mounting of attachments, of toolholders and of tools with cone and face application, especially for machining and turning centers with automatic or manual changers of tools with tapered shank, in particular with 7/24th taper, which essentially consists of a cone 1 for introduction in the spindle, of a front part 2 centered in cone 1 and provided with a flange for application against the face of the spindle and of a knob 3 for assembly of cone 1 and of the front part 2, is characterized in that assembly knob 3 acts on an intermediate adjustable, nondeformable connecting device 4 between cone 1 and front part 2.

Intermediate adjustable, nondeformable connecting device 4 between cone 1 and front part 2 consists of an intermediate part 5 mounted in a bore provided in the bottom of bore 6 for receiving front part 2 and exhibiting a tapping 7 intended to work with the thread of knob 3, of a shouldered bolt 8 with differential pitch, whose part with the larger diameter penetrates into tapping 7 of part 5 on the side opposite knob 3 and whose part with smaller diameter penetrates into a central tapping 9 of the back face of front part 2, of an elastic ring 10 for holding part 5 in its housing in cone 1, of an elastic unit 11, in the form of a stack of Belleville washers or a compression spring, mounted between the opposite faces of intermediate part 5 and front part 2, of a key 12 solid with the centering cylinder of front part 2 and guided in a groove 13 of housing 6, of a nut 14 for locking the corresponding end of bolt 8 in front part 2 and of a nut 15 for locking knob 3 screwed into the opposite end of bolt 8.

Intermediate part 5 is provided at its end turned toward knob 3 with a crosswise groove 16 for maneuvering by means of a special wrench and exhibits, at its end turned toward front part 2, a flange 17 which is provided, at regular intervals, with radial holes 18, and cone 1 is provided at the level of said radial holes 18 with at least one hole 19 for the passage of a holding rod to be inserted in one of said radial holes 18.

Shouldered bolt 8 is provided with an axial through hole and is provided, in the end screwed into front part 2, with a hollow maneuvering polygon 20, in the form of a hollow hexagon, and nuts 14 and 15 are each also provided with a hollow maneuvering polygon, 21 and 22, respectively, also in the form of a hollow hexagon, polygon 22 of nut 15 being maneuverable through a hole 23 of knob 3 and polygon 21 of nut 14 being maneuverable through a tapped hole 24 for receiving a tool of front part 2.

The device according to the invention is mounted as follows:

Intermediate part 5 is introduced into its housing in cone 1 and is held in the latter by an elastic ring 10 which rests on its flange 17. The stack of Belleville washers 11 is then put in place in the housing of cone 1 above flange 17 of part 5. Shouldered bolt 8 is then introduced by its part of smaller diameter into tapping 9 of the back face of front part 2 and applied by its shoulder against said back face. Placing of bolt 8 can be achieved by means of its maneuvering hexagon 20 by means of a wrench going through tapped hole 24 of front part 2 and nut 24. Before the introduction of bolt 8, nut 14 for locking of front part 2 will advantageously have been moved toward the top of tapped hole 9 by maneuvering of its hollow hexagonal polygon 21, to avoid any previous contact between nut 14 and the corresponding end of bolt 8. At the opposite end of bolt 8, corresponding locking nut 15 is screwed completely into its housing so as not to protrude on the back face of bolt 8.

Body 2 is provided with its key 12 and is introduced into its receiving bore 6 provided in cone 1, its guiding from rotation being performed by key 12 in groove 13 of said bore 6. When the back face of shouldered bolt 8 comes to strike against the face of part 5, a special wrench is introduced, through the hole of cone 1 intended for passage of knob 3, into crosswise groove 16 of the end of part 5 which is put in rotation to make bolt 8 penetrate into its tapping 7. This screwing has the effect of driving part 2 into housing 6 of cone 1, front part 2 then strikes against the stack of Belleville washers 11, whose purpose is to exert a certain pressure between intermediate part 5 solid with cone 1 and said front part 2 during locking of the latter by means of bolt 8 in cone 1, until there is obtained a spacing limit b between the back face of the flange of front part 2 and the front face of cone 1, necessary for final locking of said front part 2 against the face of the spindle. This spacing limit b, which is fixed relative to the theoretical gauge line, should be such that it corresponds to a distance greater than the addition of all the tolerances of the standards of the attachments and spindles. The stack of Belleville washers 11 is intended to exert a pressure on the threads of shouldered bolt 8 to apply them well against the sides of the corresponding tappings and to avoid too easy unlocking. This stack 10 therefore acts as a brake.

As soon as limit b is reached, a rod is introduced through hole 19 into one of the radial holes 18 of flange 17 of part 5, namely that which is closest to hole 19 to modify limit b as little as possible.

Knob 3 is then introduced, through the hole of the corresponding end of cone 1, into part 5 to achieve its locking against the face of cone 1, and the rod is removed.

The unit thus obtained can then be subjected to a final adjustment in a machine spindle.

For this purpose, it is introduced manually into the spindle and fastened by means of the lock of the machine. Adjustment of the application of the back face of the flange of part 2 and of the front face of the spindle, remains to be done, cone 1 being well applied in the taper of the spindle. A wrench is introduced into hexagon 20 of bolt 8, which is put in rotation to make front part 2 advance until application and locking against the face of the spindle. The locking force to be developed will be calculated and indicated as a function of the types of machines and existing locks, as well as the pull developed by the latter. After application of the two faces, nut 14 is locked against bolt 8. The attachment is dismounted from the machine and nut 15 is locked, by means of a wrench penetrating into its hexagon 18 through hole 23 of knob 3, against the corresponding face of the latter. The unit is then ready for use on a machine, after fastening of a milling cutter, a cutting tool or any other tool.

In practice, adjustment is performed relatively fast because of the fact that only said last operation is necessary, the other operations being able to be performed during the preparation and search for the tools before machining of a part.

The groove for receiving elastic ring 10 is advantageously a dropped groove of grinding wheels for grinding bore 6 for receiving front part 2.

The device according to the invention can also be used without shouldered bolt 8, knob 3 then being replaced by a long knob centered behind cone 1 and fastened in the thread of front part 2, the mutual locking of cone 1 and front part 2 being achieved by locking of the long knob and then the locking of the unit by application of nut 14 against said long knob.

FIGS. 2 to 7 represent various possibilities of fastening the turning insert-holder elements to the device according to the invention.

Figure 2:
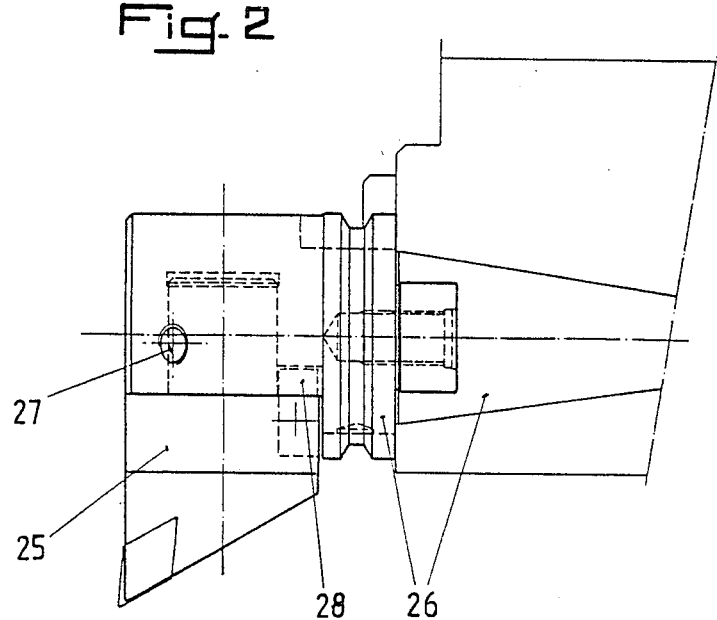

FIG. 2 represents a first turning unit whose insertholder element modular element 25 is placed perpendicular to the axis of device 26, element 25 being fastened to device 26 by a modular system comprising two bolts with spherical ends 27 placed at 120° C. and a tenon 28.

FIG. 3 represents another turning unit whose insertholder modular element 29 is placed and centered on a male modular element 30 in the axis of device 26, the connection between elements 29 and 30 also being achieved by bolts with spherical ends 27 and a tenon 28.

As FIGS. 4 and 5 show, male modular element 30 is provided with spherical marks 31 slightly elongated in the direction of the circumference, making possible an adjustment in height of insert-holders 29 by means of tangential bolts 32 resting on tenon 38, which is housed in a groove of greater width 33 of the flange of front part 2. It is thus possible to correct errors that can occur on the toolholder turret head of the lathe or also to adjust a good position of the cutting edge of the insert. Overdimensioning of groove 33 relative to tenon 28 is intended to allow a rotation movement of insert-holders 29 during its adjustment by means of bolts 32. Bolts with spherical ends 27 make possible an extremely effective application of the faces and a powerful locking.

FIG. 6 represents an insert-holder 29 which is advantageously provided with a lubrication nozzle 34 and two tappings 35 for receiving bolts with spherical ends 27, as well as an attached insert 36, the housing of the end of front part 2 being closed by means of a cover (not shown) attached and glued in a spot facing of the free end of insert-holder 29. Thus, lubrication at the level of the cutting insert can be achieved without leaking, while avoiding a penetration of chips or other things, running the risk of damaging the attachment.

Figure 7:
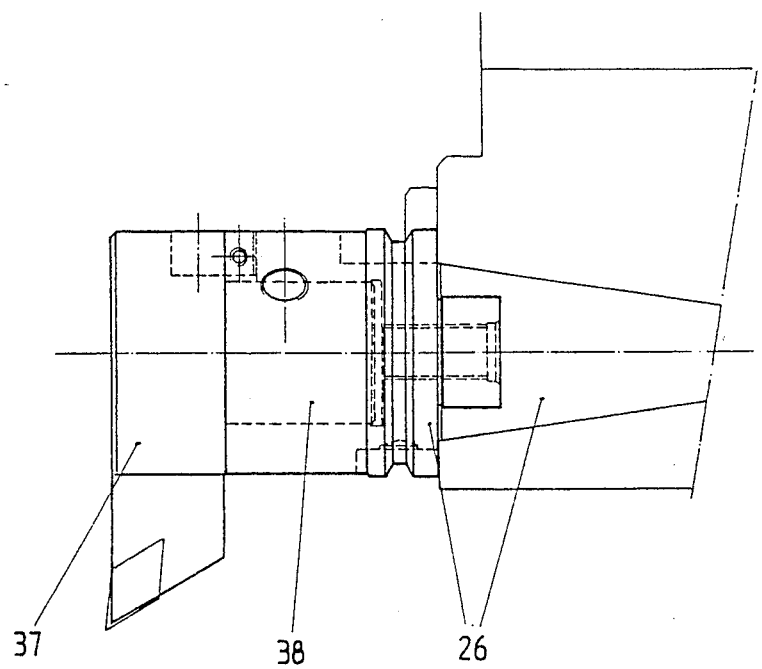
FIG. 7 is a view similar to that of FIGS. 2 and 3 of another mounting of the toolholders by a device according to the invention.

FIG. 7 represents another insert-holder 37 provided with a modular shank penetrating into a female modular element 38 mounted on device 26 according to the invention, insert-holder 37 being fastened to female modular element 38 by means of bolts with spherical ends 27' and a tenon 28'. This fastening is similar to that described relative to FIGS. 4 to 6.

Figure 8:
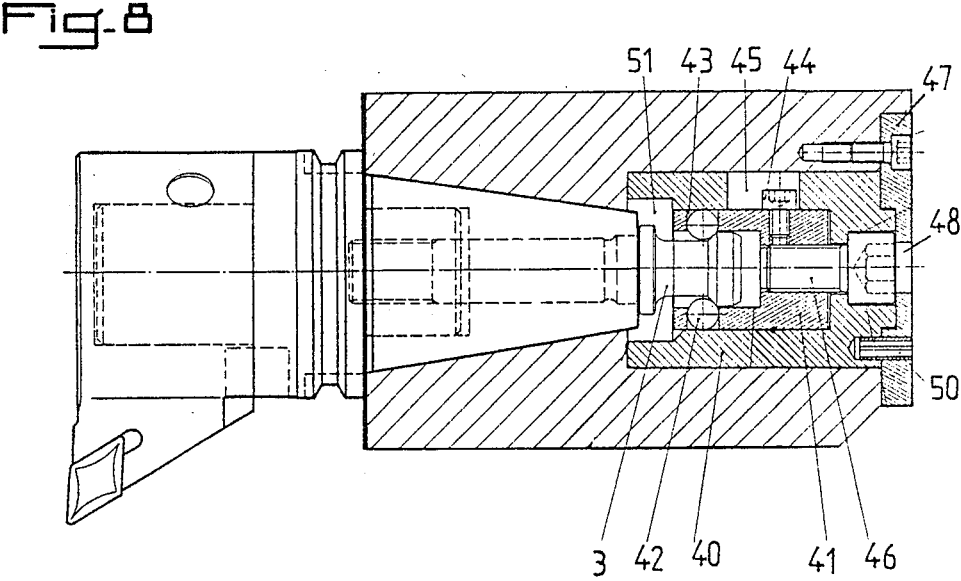
FIG. 8 is a lateral elevation view, partially in section, of a variant embodiment of the invention adapted to the fastening of turning cassettes.

FIGS. 8 and 9 represent variant embodiments of the invention adapted to manual or automatic fastening of the device in turning cassettes. For this purpose, and as shown in FIG. 8, for fastening by manual locking, the device is mounted by its cone 1 in a cassette 39 with the support of the flange of its front part against said cassette which is provided, at the level of knob 3 of the device, with a body 40 in which is mounted, with movement, a piston 41 for receiving the end of knob 3, provided with holding balls 42 guided in housings 43, and provided with a travel limit bolt 44 guided in a groove 45 of body 40, piston 41 being able to move in body 40 by means of a bolt 46, which is locked in translation by means of flange 47 mounted on the end of cassette 39 and of body 40, above the countersink receiving the head of bolt 46, and exhibiting a hole 48 for passage of a wrench for maneuvering of said bolt 46, preferably with a hollow hexagonal head, with securing in rotation between cassette 39 and body 40 being achieved by means of an elastic pin 50 fastened in body 40 and going through flange 47, and body 40 further exhibiting, in its front part, a spot facing 51. In a known way, flange 47 is mounted on cassette 39 and body 40 by means of bolt 49.

Body 40, with its constitutive parts, is inserted in cassette 39 and fastened in the latter by means of flange 47. The device according to the invention is fastened in cassette 39 by its knob 3, whose grasping profile is grasped by balls 42, which are drawn backward by bolt 46 by means of piston 41. Unlocking is performed by a reverse rotation of bolt 46 causing the advance of piston 41 and balls 42 until the latter fall into spot facing 51 provided at the front part of body 40, so that the grasping profile of the knob is freed, and a continuation of the rotation of bolt 46, until striking of the back face of knob 3 against the bottom of its housing in body 41, allowing unlocking of the cone and removal of the device.

The device described above can easily be adapted for an automatic locking, the wrench controlling bolt 46 simply having to be controlled by a reversible electric motor, or some other.

According to another variant embodiment of the invention, according to FIG. 9, for fastening by automatic locking, the device is mounted by its cone 1 in a fastening cassette 39' and rests, by its flange, against the front face of said cassette 39', which is further provided with a case 40' consisting of a body 52 in which is mounted, with sliding, a piston 53, exhibiting on its front face a housing for receiving the grasping part of knob 3 and which is provided on its periphery with holding balls 54 guided in housings 55 and able to escape outward in a spot facing 56 of the front part of body 52, by a stack of Belleville washers 57 resting, at one end, on the one hand, in a spot facing of the back part of body 52 and, on the other hand, at its other end, against the head of a bolt 58 penetrating into the back face of piston 53, body 52 being kept in the cassette 39' by means of a flange 47' fastened to said cassette 39' by bolts 49', this flange 47' further being provided with an elastic pin 59 working with a groove 60 of said body 52 for securing in rotation. Flange 47' makes possible the locking of case 40' against the bottom of its receiving bore in cassette 39'.

According to another characteristic of the invention, piston 53 exhibits a back end-of-travel support shoulder in the housing of part 52.

After mounting of case 40' in its bore of cassette 39' and locking of flange 47', its securing in position being achieved by means of pin 59 solid with said flange 47' and working with the groove of body 52, knob 3 of the toolholder device can be mounted between balls 54, which are drawn backward by piston 53 against the action of Belleville washers 57 on bolt 58.

Unlocking of the toolholder is performed by means of a hydraulic, pneumatic or mechanical independent outside ejection system, axially shoving bolt 58 in the direction of the toolholder to cause piston 53 to advance by compression of washers 57 to allow radial movement of balls 54 toward the wall of spot facing 56 and the release of knob 3, the ejection of the toolholder being achieved by a continuation of the advance of piston 53 until it strikes against the back face of knob 3.

The toolholder can be removed by a changer arm, or manually, and the pressure on bolt 58, and therefore on piston 53, is maintained until the introduction of a new toolholder whose locking will be performed as described above.

Of course, balls 54 and 42, which are used, can be replaced, as is customary in machining centers, with a system of shaped slit clamps exhibiting numerous slits allowing a great flexibility making possible the opening of the clamps at the moment of advance of the piston in the direction of the toolholder and their closing in case of a reverse movement, these clamps being of one piece with or an integral part of the piston and exhibiting an inside front rim of smaller diameter forming a grasping nose of the knob, whose face working with said clamps is straight and perpendicular to the axis.

The cases according to FIGS. 8 and 9 are easily interchangeable in their cassettes 39 and 39' without modification, because they exhibit the same dimensions and bulk, only their back mounting flange 47 and 47' having to be changed.

Thanks to the invention, it is possible to achieve a device for mounting of attachments, toolholders and tools with cone and face application, especially for machining and turning centers with automatic or manual changers of tools with tapered shank, in particular with 7/24th taper, making possible a cone and face application, with optional slight locking pressure and offering the advantages of a single-piece attachment, namely, especially, rigidity, independently of the characteristics of the machine lock, whose entire pressure is exerted both on cone 1 and on front part 2.

Further, the device according to the invention can be used interchangeably on all machining and turning centers.

Of course, the invention is not limited to the embodiments described and represented in the accompanying drawings. Modifications remain possible, particularly from the viewpoint of the constitution of the various elements or by substitution of technical equivalents, without going outside the scope of protection of the invention.

I claim:

1. Device for mounting of attachments, toolholders and tools with cone and face application, especially for machining and turning centers with automatic or manual changers of tools with tapered shank, in particular with 7/24th taper, comprising a cone (1) for introduction in the spindle, a front part (2) centered in an aperture in said cone (1) and provided with a flange for application against the face of the spindle and a gripping knob (3) for assembly of cone (1) and front part (2), in which said gripping knob is connected to an intermediate non-deformable connecting device having means to allow adjustment of the length thereof, said connecting device being connected to said front part thereby to secure said front part to said cone.

2. Device according to claim 1, wherein intermediate adjustable, nondeformable connecting device (4) between cone (1) and front part (2) consists of an intermediate part (5) mounted in a bore provided in the bottom of bore (6) for receiving front part (2) and exhibiting a tapping (7) intended to work with the thread of knob (3), of a shouldered bolt (8) with differential pitch, whose part with the larger diameter penetrates into tapping (7) of part (5) on the side opposite knob (3) and whose part with smaller diameter penetrates into a central tapping (9) of the back face of front part (2), of an elastic ring (10) for holding part (5) in its housing in cone (1), of an elastic unit (11), in the form of a stack of Belleville washers or a compression spring, mounted between the opposite faces of intermediate part (5) and front part (2), of a key (12) solid with the centering cylinder of front part (2) and guided in a groove (13) of housing (6), of a nut (14) for locking the corresponding end of bolt (8) in front part (2) and of nut (15) for locking knob (3) screwed into the opposite end of bolt (8).

3. Device according to claim 2, wherein intermediate part (5) is provided at its end turned toward knob (3) with a crosswise groove (16) for maneuvering by means of a special wrench and exhibits, at its end turned toward front part (2), a flange (17) which is provided, at regular intervals, with radial holes (18), and cone (1) is provided at the level of said radial holes (18) with at least one hole (19) for the passage of a holding rod to be inserted in one of said radial holes (18).

4. Device according to claim 2, wherein shouldered bolt (8) is provided with an axial through hole and is provided, in the end screwed into front part (2), with a hollow maneuvering polygon (20), in the form of a hollow hexagon, and nuts (14) and (15) are each also provided with a hollow maneuvering polygon, (21) and (22), respectively, also in the form of a hollow hexagon, polygon (22) of nut (15) being maneuverable through a hole (23) of knob (3) and polygon (21) of nut (14) being maneuverable through a tapped hole (24) for receiving a tool from front part (2).

5. Device according to claim 1, wherein it is provided with insert-holder element modular element (25, 29) fastened by a modular system comprising two bolts with spherical ends (27) placed at 120° C. and a tenon (28) on a male modular element (30) mounted in the device and provided with spherical marks (31) slightly elongated in the direction of the circumference, making possible an adjustment of insert-holders (29) by means of tangential bolts (32) resting on tenon (38), which is housed in a groove of greater width (33) of the flange of front part (2).

6. Device according to claim 1, wherein it is mounted by its cone (1) in a cassette (39) with the support of the flange of its front part against said cassette which is provided, at the level of knob (3) of the device, with a body (40) in which is mounted, with movement, a piston (41) for receiving the end of knob (3), provided with holding balls (42) guided in housings (43), and provided with a travel limit bolt (44) guided in a groove (45) of body (40), piston (41) being able to move in body (40)

by means of a bolt (46), which is locked in translation by means of a flange (47) mounted on the end of cassette (39) and of body (40), above the countersink for receiving the head of bolt (46), and exhibiting a hole (48) for the passage of a wrench for maneuvering of said bolt (46), preferably with a hollow hexagonal head, with the securing in rotation between cassette (39) and body (40) being achieved by means of an elastic pin (50) fastened in body (40) and going through flange (47), and body (40) further exhibiting, in its front part, a spot facing (51).

7. Device according to claim 1, wherein the device is mounted by its cone (1) in a fastening cassette (39') and rests, by its flange, against the front face of said cassette (39'), which is further provided with a case (40)' consisting of a body (52) in which is mounted, with sliding, a piston (53), exhibiting on its front face a housing for receiving the grasping part of knob (3) and which is provided on its periphery with holding balls (54) guided in housings (55) and able to escape outward in a spot facing (56) of the front part of body (52), by a stack of Belleville washers (57) resting, at one end, on the one hand, in a spot facing of the back part of body (52) and, on the other hand, at its other end, against the head of a bolt (58) penetrating into the back face of piston (53), body (52) being kept in the cassette by means of a flange (47') fastened to said cassette (39') by bolts (49'), this flange (47)' further being provided with an elastic pin (59) working with a groove (60) of said body (52) for securing in rotation.

8. Device according to claim 7, wherein piston (53) exhibits a back end-of-travel shoulder in the housing of part (52).

* * * * *